United States Patent [19]

De Vries et al.

[11] 4,317,967
[45] Mar. 2, 1982

[54] FAULT ISOLATION DEVICE

[76] Inventors: Paul De Vries; Steven Gewitz; Roald G. Heyman, all of 71 W. 23rd St., New York, N.Y. 10010

[21] Appl. No.: 169,715

[22] Filed: Jul. 17, 1980

[51] Int. Cl.³ .............................................. H04B 3/46
[52] U.S. Cl. ............................................. 179/175.3 R
[58] Field of Search ......... 179/175, 175.2 R, 175.2 C, 179/175.3 R, 175.3 F, 175.1 R, 175.25, 16 A, 16 AA; 307/234, 237; 324/52, 95

[56] References Cited

U.S. PATENT DOCUMENTS 1,750,666  3/1930  Glezen et al.
3,514,552  5/1970  Smith ........................ 179/175.25
4,197,435  4/1980  Jackson et al. ............. 179/175.3 R Primary Examiner—Thomas A. Robinson
Attorney, Agent, or Firm—Curtis, Morris & Safford

[57] ABSTRACT

A telephone fault isolation device is installed between customer telephone equipment, such as a PBX or KSU, and telephone company trunk lines feeding into such equipment, and is used to determine whether possible trouble is in the telephone company trunk lines or in the customer equipment. The device includes a monitoring device, such as a telephone handset, and an array of switches each associated with a telephone trunk line. Each of the switches, in a normal condition, connects the trunk line to the equipment, and, in a test condition, connects the trunk line to the monitoring device. A telephone customer can switch over each of the switches in turn and determine whether he can obtain dial tone on that respective trunk line.

9 Claims, 2 Drawing Figures

FAULT ISOLATION DEVICE

BACKGROUND OF THE INVENTION

This invention relates to telephony and in particular relates to a fault isolation device for determining whether a fault occurring in a telephone system lies with the local telephone company or in customer-owned telephone equipment.

Owing to FCC rulings favorable to purveyors of telephone equipment and also to the influx of competition among manufacturers of communications equipment, more and more telephone customers now furnish their own "customer-owned" equipment, such as private branch exchanges (PPX's) and key systems (KSU's). Formerly, equipment had only been leased from the local telephone company. However, customer-owned equipment is still connected to the local telephone company's dial central office over leased telephone trunks.

When trouble occurs within the telephone system including leased telephone trunks and customer-owned equipment such trouble does not necessarily lie with the telephone company, as it is possible that the phone trouble could exist in the customer-owned equipment. While the telephone company will test and repair its own leased equipment, it has no responsibility for the customer-owned equipment, and if the phone company is called and it is determined that the trouble lies in the customer-owned equipment, the customer will be charged for the service call, notwithstanding that an estimated 80% of such troubles are in the phone company's leased trunks or in the dial central office. The charge for such a service call can amount to as much as $45.00.

In order to avoid such a charge for an unnecessary service call, it is desirable for the customer to determine whether the fault lies with the customer-owned equipment or with the telephone company so that it can be decided whether to call the telephone company or to call in a serviceman for the customer-owned equipment to clear the trouble.

However, in conventional customer-owned PBX and KSU systems, there is no provision for isolating the telephone company trunks from the customer-owned equipment, and thus, there is no easy way that the customer can determine whether the problem lies in his equipment or with the phone company.

OBJECTS AND SUMMARY OF THE INVENTION

It is an object of this invention to provide a novel fault isolation device capable of isolating telephone system problems.

It is another object of this invention to provide a fault isolation device which is simple in design and construction while being reliable in operation.

It is yet another object of this invention to provide a fault isolation device that permits a customer to quickly determine whether a telephone system problem lies with his equipment or with the telephone company.

According to an aspect of this invention, a telephone line fault isolation device, which is to be installed in line between one or more telephone trunk lines and customer-owned telephone equipment, such as a PBX or a KSU, normally coupled to the one or more trunk lines, comprises a monitoring device, such as a telephone handset, for selectively monitoring the trunk lines; and a line switch array associated with the monitoring device and with the one or more telephone trunk lines for selectively coupling the monitoring device with each of the telephone trunk lines, and for each such telephone trunk line having a normal condition in which the respective telephone trunk line is coupled to the customer-owned telephone equipment and a test condition in which the respective telephone trunk line is disconnected from the customer-owned telephone equipment and is connected instead to the monitoring device. Preferably, the line switch array includes double-pole double-throw switches, each associated with a respective telephone trunk line and being of the momentary, non-locking type that is spring biased into its normal condition and must be manually held in its test condition. Preferably, for the purpose of providing a ground signal to the telephone central office to induce a dial tone, the fault isolation device also includes a ground start switch having one contact coupled to ground and another contact coupled to the switch array, so that, in the test position, the other contact of the ground start switch is coupled to the tip side of a respective one of the telephone trunk lines.

DETAILED DESCRIPTION OF THE PREFERRED EMBODIMENT OF THE INVENTION

Figure 1:
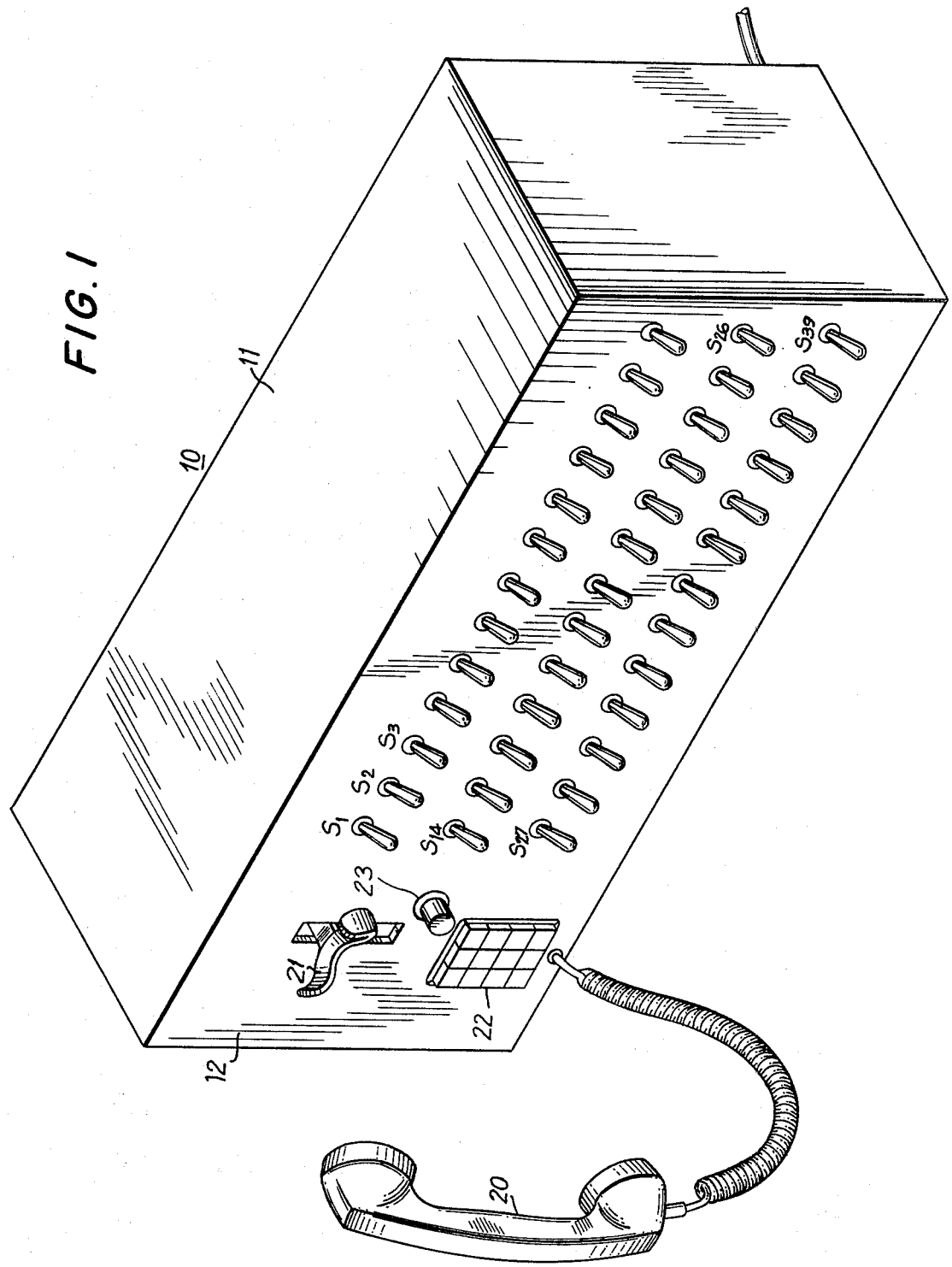
FIG. 1 is a perspective view of a preferred arrangement of the fault isolation device of this invention.

With reference to the drawings and initially to FIG. 1 thereof, a telephone fault isolation device 10 according to this invention includes a case 11 suitable for mounting next to or along side a customer-owned PBX or KSU system. A front panel 12 of the device 10 includes an array of double-pole double-throw switches $S_1, S_2 \ldots S_{39}$, here arranged in three rows of thirteen switches each. Of course, the number of switches $S_1$–$S_{39}$ will depend on the number of telephone trunk lines to which the customer-owned equipment is connected, although these switches are preferably arranged in rows of six switches or in rows of thirteen switches. The switches $S_1$–$S_{39}$ are non-locking two-position toggle switches, spring biased into a normal position and movable to a momentary-contact test position. A telephone handset 20, with a cradle 21 therefor, is provided to monitor a selected one of the telephone trunk lines. A dialer 22 is also provided on the front panel 12. Here, dialer 22 is a touch-tone pad providing tone signals for selective-tone dialing. However, in an alternative embodiment, dialer 22 can be a rotary dial. A push-button grounding switch 23 is also provided for inducing dial tone when the telephone trunk lines are of the ground-start trunking type.

Figure 2:
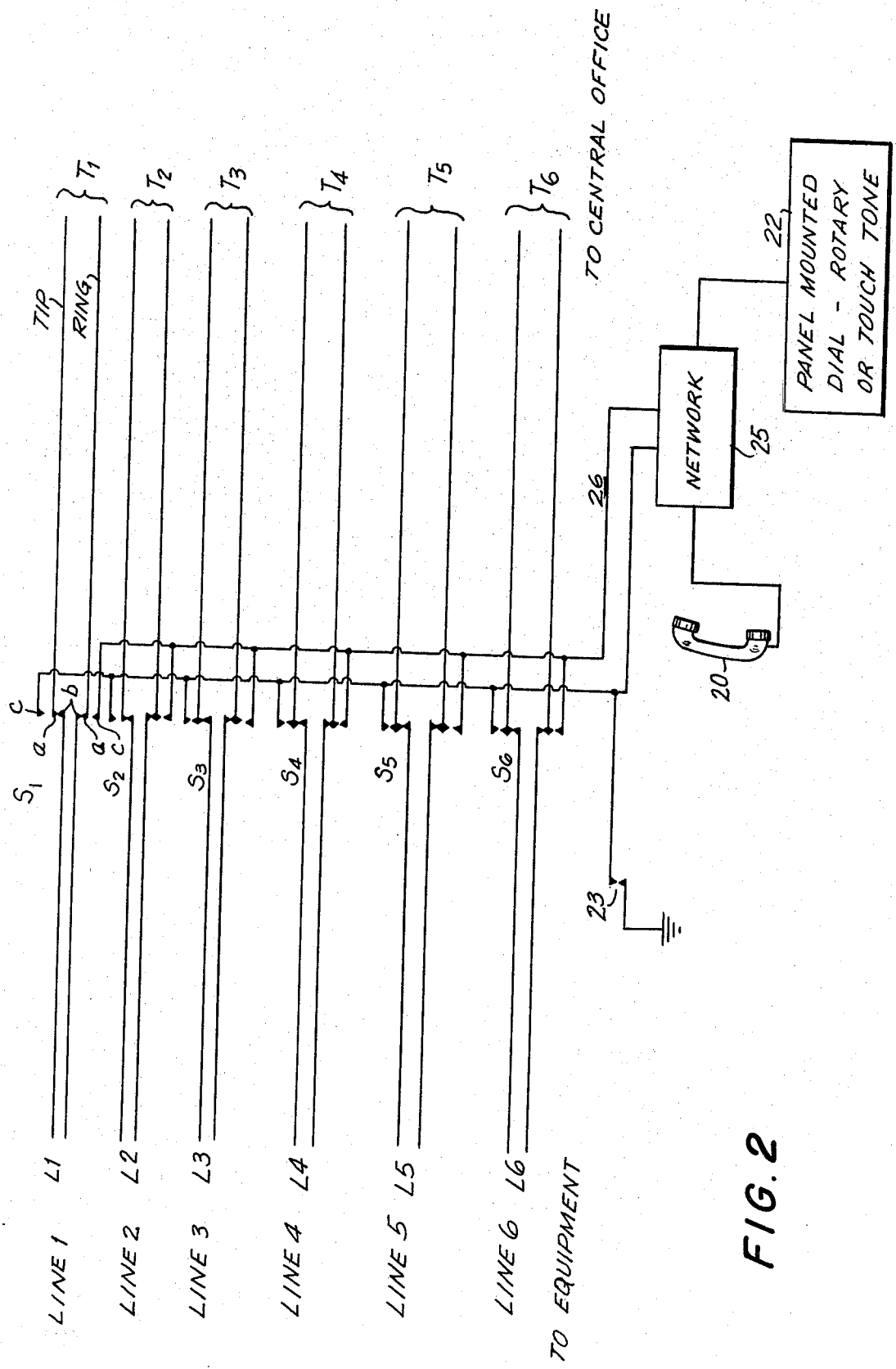
FIG. 2 is a schematic diagram of the fault isolation device of this invention.

A schematic diagram of the fault isolation device 10 of this invention is shown in FIG. 2. While only six switches $S_1$–$S_6$ are shown in FIG. 2 to avoid unnecessary clutter in that view, it is to be understood that any desired number of switches $S_1$–$S_{39}$ could be provided, according to this invention, for a like number of telephone trunks. The reference numerals used in FIG. 2 indicate the same elements previously identified in FIG. 1, and a detailed description of such elements is omitted herein. Lines $L_1$–$L_6$ are cable pairs which lead to the customer-owned equipment. Telephone trunk lines $T_1$–$T_6$ are leased phone company lines, here telephone central office trunks. However, in a suitable environment, the trunks $T_1$–$T_6$ could be foreign exchange trunks or trunks to a second customer-owned PBX at another location. Also shown in this view is a network 25 such as that normally found in a telephone instrument, for linking the handset 20 and dialer 22 to an outgoing cable pair 26. Each of the six double-pole double-throw switches $S_1$–$S_6$, here typified by switch $S_1$, has a pair of movable contacts a to which the trunk line $T_1$ is coupled, a first set of fixed contacts b to which a corresponding PBX line $L_1$ is coupled, and a second set of fixed contacts c to which the cable pair 26 from network 25 is connected. In the normal condition for each of the switches $S_1$–$S_6$, the respective PBX line $L_1$–$L_6$ is coupled to a respective trunk line $T_1$–$T_6$. The contacts c for each of switches $S_1$–$S_6$ are momentary contacts, and the cable pair 26 is coupled to one of trunk lines $T_1$–$T_6$ only if the respective switch $S_1$–$S_6$ is held in its test position. Ground start switch 23 is coupled to the wire of the cable pair 26 which is associated with the "tip" side of each of the respective central office trunks $T_1$–$T_6$. In FIG. 2, the upper of the two wires for each of trunks $T_1$–$T_6$ represents the tip side while the lower of the two represents the ring side.

The fault isolation device of this invention can be operated quickly and reliably to determine which, if any, of the associated trunk lines $T_1$–$T_6$ is faulty. A customer experiencing trouble and desiring to clear the trouble expeditiously, must first determine whether the trouble lies in his customer-owned equipment or in the telephone company trunk lines. In order to make this determination, the customer simply picks up the handset, moves toggle switch $S_1$ to its "test" position, thereby disconnecting trunk line $T_1$ from line $L_1$ going to the customer-owned equipment, and connecting it instead to the cable pair 26 leading to network 25 and handset 20. The customer then listens for dial tone. If there is dial tone, he can then actuate dialer 22 to test whether it is possible, by dialing, to break dial tone. If the customer can hear dial tone and then can break dial tone, the trunk is determined to be good. However, if the customer cannot achieve dial tone, or alternatively cannot break dial tone, the trunk becomes suspect. It is here noted that if trunk lines $T_1$–$T_6$ are of the ground-start type, the customer must depress the ground-start button 23 to signal a ground through the tip side of trunk $T_1$ to initiate dial tone.

After testing trunk line $T_1$, the customer then repeats the process for each of the remaining trunks by actuating switches $S_2$–$S_6$ in turn to their test positions while listening for dial tone. If all the trunk lines are good, then the fault is isolated to the equipment.

If the fault isolation device 10 of this invention is to be used with four-wire tie-line trunks which connect two PBX's together, a pair of momentary-contact switches are provided instead of grounding switch 23. Switches $S_1$–$S_{39}$ in such case should be three-position switches having a central normal position, a first test position to test for dial trunk leaving and a second test position to test for dial trunk coming. Normally, the so-called "E and M" signaling system is used for four-wire trunking, and one of the momentary-contact switches is arranged to ground the E wire to test for dial tone leaving, while the other momentary-contact switch is connected to apply 48 volts to the M wire to test for dial tone coming.

The simplicity of the fault isolation device 10 of this invention makes it extremely reliable. Such a simple, straightforward device assures that if trouble does occur in the telephone system, the trouble lies either with the telephone company trunk line or with the customer-owned equipment, and is not in the fault isolation device itself.

Many modifications and variations can be effected to the above-described embodiment without departing from the scope and spirit of the present invention which is to be ascertained from the appended claims.

We claim as our invention:

1. A telephone line fault isolation device to be installed in line between one or more telephone trunk lines and customer telephone equipment coupled to said one or more trunk lines, the device comprising
   auditory monitoring means for selectively monitoring audible tones on said trunk lines; and
   line switch means associated with said auditory monitoring means and said one or more telephone trunk lines for selectively coupling the same and, for each said telephone trunk line, having a normal condition in which the respective telephone trunk line is coupled to said customer telephone equipment and a test condition in which said respective trunk line is disconnected from said customer telephone equipment and is connected to said auditory monitoring means.

2. A telephone line fault isolation device to be installed in line between one or more telephone trunk lines and customer telephone equipment coupled to said one or more trunk lines, the device comprising:
   monitoring means for selectively monitoring said trunk lines; and
   line switch means associated with said monitoring means and said one or more trunk lines for selectively coupling the same including a double-pole double-throw switch associated with each said respective telephone trunk line, each said switch having a first pair of fixed contacts connected to said customer telephone equipment, a second pair of fixed contacts connected to said monitoring means, and a pair of movable contacts coupled to said respective trunk line, whereby in a normal condition the respective telephone trunk line is coupled to said customer telephone equipment and in a test condition the respective trunk line is disconnected from said customer telephone equipment and is connected to said monitoring means.

3. A telephone line fault isolation device according to claim 2, wherein each said double-pole double-throw switch is of the momentary, non-locking type in which the pair of movable contacts is resiliently biased against said first pair of fixed contacts and is maintained against said second pair of fixed contacts only so long as said switch is manually held in its test condition.

4. A telephone line fault isolation device according to claim 2, in which there are provided a plurality of switches corresponding to a respective plurality of telephone trunk lines.

5. A telephone line fault isolation device according to claim 2, wherein each said respective trunk line has a tip side and a ring side, and further comprising a ground-start switch having one contact coupled to ground and another contact coupled to the one of said pair of second fixed contacts that contacts, in said test condition, the one of said pair of movable contacts associated with said tip side.

6. A telephone fault isolation device to be installed in line between one or more telephone trunk lines and customer telephone equipment coupled to said one or more trunk lines, the device comprising:

monitoring means for selectively monitoring said trunk lines and including telephone handset means for providing an audio tone if a dial tone is received thereon; and line switch means associated with said monitoring means and said one or more telephone trunk lines for selectively coupling the same and, for each said telephone trunk line, having a normal condition in which the respective telephone trunk line is coupled to said customer telephone equipment and a test condition in which said respective trunk line is disconnected from said customer telephone equipment and is connected to said monitoring means, whereby said audio tone is provided if said dial tone is received when said line switching means is in the test condition for said respective trunk line.

7. A telephone line fault isolation device according to claim 6, wherein said monitoring means further includes telephone dialing means for providing signals on said respective telephone trunk line for dialing.

8. A telephone line fault isolation device according to claim 7, wherein said monitoring means further includes a network for coupling said handset means and said dialing means to said line switching means.

9. A telephone line fault isolation device to be installed in line between one or more telephone trunk lines and customer telephone equipment coupled to said one or more trunk lines, the device comprising:

monitoring means for selectively monitoring said trunk lines;

line switch means associated with said monitoring means and said one or more telephone trunk lines for selectively coupling the same and, for each said telephone trunk line, having a normal condition in which the respective telephone trunk line is coupled to said customer telephone equipment and a test condition in which said respective trunk line is disconnected from said customer telephone equipment and is connected to said monitoring means; and ground-start switching means for selectively providing a ground to said respective telephone trunk line when said line switching means is in its test condition.

* * * * *